(12) United States Patent
Pagolu et al.

(10) Patent No.: US 11,971,809 B2
(45) Date of Patent: Apr. 30, 2024

(54) SYSTEMS AND METHODS FOR TESTING COMPONENTS OR SCENARIOS WITH EXECUTION HISTORY

(71) Applicant: JPMORGAN CHASE BANK, N.A., New York, NY (US)

(72) Inventors: Sireesha Pagolu, Plano, TX (US); Srinu Dasari, Euless, TX (US)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 17/817,099

(22) Filed: Aug. 3, 2022

(65) Prior Publication Data

US 2023/0043547 A1 Feb. 9, 2023

Related U.S. Application Data

(60) Provisional application No. 63/229,285, filed on Aug. 4, 2021.

(51) Int. Cl.
*G06F 11/36* (2006.01)
*G06N 20/00* (2019.01)

(52) U.S. Cl.
CPC ......... *G06F 11/3684* (2013.01); *G06N 20/00* (2019.01)

(58) Field of Classification Search
CPC ............ G06F 11/3684; G06F 11/3664; G06F 11/3692; G06F 11/3688; G06N 20/00
See application file for complete search history.

(56) References Cited

U.S. PATENT DOCUMENTS

| | | | | |
|---|---|---|---|---|
| 2014/0237451 A1* | 8/2014 | Koneru | ............... | G06F 11/3692 717/124 |
| 2015/0161031 A1* | 6/2015 | Chea | ................... | G06F 11/3672 717/125 |
| 2019/0332523 A1* | 10/2019 | Gefen | ...................... | G06N 7/01 |
| 2021/0287109 A1* | 9/2021 | Cmielowski | ........ | G06F 11/3692 |

* cited by examiner

*Primary Examiner* — Thien Nguyen
(74) *Attorney, Agent, or Firm* — GREENBERG TRAURIG LLP

(57) ABSTRACT

Systems and methods for testing components or scenarios with execution history are disclosed. A method may include: receiving, at a testing interface and from an application or program executed by a user electronic device, an identification of a test and one or more data layers of a plurality of data layers in pod to test, the plurality of data layers including a data collection layer, a data ingestion layer, a data messaging layer, a data enrichment layer, and a data connect layer; receiving, by the testing interface, a selection of testing parameters or values for the identified test; retrieving, by the testing interface, the identified test; executing, by the testing interface, the identified test on the identified one or more data layers using the selected testing parameters or values; retrieving, by testing interface, results of the execution of the test; and outputting, by the testing interface, the results.

20 Claims, 3 Drawing Sheets

SYSTEMS AND METHODS FOR TESTING COMPONENTS OR SCENARIOS WITH EXECUTION HISTORY

RELATED APPLICATIONS

This application claims priority to U.S. Provisional Patent Application Ser. No. 63/229,285, filed Aug. 4, 2021, the disclosure of which is hereby incorporated, by reference, in its entirety.

BACKGROUND OF THE INVENTION

1. Field of the Invention

Embodiments are generally directed to systems and methods for testing components or scenarios with execution history.

2. Description of the Related Art

Testing computer applications having multiple integration touch points and internal components that integrate with multiple infrastructure layers is complicated and time consuming. Technical resources need to understand functionality to write the test cases and need to understand each layer of such a service.

SUMMARY OF THE INVENTION

Systems and methods for testing components or scenarios with execution history are disclosed. According to one embodiment, a method for testing components or scenarios with execution history may include: (1) receiving, at a testing interface and from an application or program executed by a user electronic device, an identification of a test and one or more data layers of a plurality of data layers in pod to test, the plurality of data layers including a data collection layer, a data ingestion layer, a data messaging layer, a data enrichment layer, and a data connect layer; (2) receiving, by the testing interface, a selection of testing parameters or values for the identified test; (3) retrieving, by the testing interface, the identified test; (4) executing, by the testing interface, the identified test on the identified one or more data layers using the selected testing parameters or values; (5) retrieving, by testing interface, results of the execution of the test; and (6) outputting, by the testing interface, the results.

In one embodiment, the method may also include retrieving, by the testing interface, default parameters or values for the test, and presenting, by the testing interface, the default parameters or values. The selected testing parameters or values may be a subset of the default parameters or values.

In one embodiment, the method may also include outputting, by the testing interface, an alert in response to the execution of the test failing.

In one embodiment, the method may also include generating, by the testing interface, synthetic data for the identified test.

In one embodiment, the identified test may be scheduled.

In one embodiment, the method may also include training, by the testing interface, a machine learning engine based on a plurality of test results. The machine learning engine may be trained to identify immediate threats or peaks from the plurality of test results.

According to another embodiment, a system may include a user electronic device executing a user testing interface, a testing interface executed by a server, and a pod comprising a plurality of data layers including a data collection layer, a data ingestion layer, a data messaging layer, a data enrichment layer, and a data connect layer. The testing interface receives an identification of a test and one or more data layers of the plurality of data layers in pod to test from the user testing interface; the testing interface receives a selection of testing parameters or values for the identified test from the user testing interface; the testing interface retrieves the identified test from a testing tools/framework comprising a plurality of testing tools and frameworks; the testing interface executes the test on the identified one or more data layers using the selected testing parameters or values; the testing interface retrieves results of the execution of the test; and the testing interface outputs the results.

In one embodiment, the testing interface retrieves default parameters or values for the test, and presents the default parameters or values. The selected testing parameters or values may be a subset of the default parameters or values.

In one embodiment, the testing interface outputs an alert in response to the execution of the test failing.

In one embodiment, the testing interface generates synthetic data for the identified test.

In one embodiment, the identified test is scheduled.

In one embodiment, the testing interface trains a machine learning engine based on a plurality of test results. The machine learning engine may be trained to identify immediate threats or peaks from the plurality of test results.

In another embodiment, a non-transitory computer readable storage medium, may include instructions stored thereon, which when read and executed by one or more computer processors, cause the one or more computer processors to perform steps comprising: receiving an identification of a test and one or more data layers of a plurality of data layers in a pod to test from a user testing interface; receiving a selection of testing parameters or values for the identified test from the user testing interface; retrieving the identified test from a testing tools/framework comprising a plurality of testing tools and frameworks; executing the test on the identified one or more data layers using the selected testing parameters or values; retrieving results of the execution of the test; and outputting the results.

In one embodiment, the non-transitory computer readable storage medium may also include instructions stored thereon, which when read and executed by one or more computer processors, cause the one or more computer processors to perform steps comprising: retrieving default parameters or values for the test; and presenting the default parameters or values. The selected testing parameters or values may be a subset of the default parameters or values.

In one embodiment, the non-transitory computer readable storage medium of may also include instructions stored thereon, which when read and executed by one or more computer processors, cause the one or more computer processors to perform steps comprising outputting an alert in response to the execution of the test failing.

In one embodiment, the non-transitory computer readable storage medium may also include instructions stored thereon, which when read and executed by one or more computer processors, cause the one or more computer processors to perform steps comprising generating synthetic data for the identified test.

In one embodiment, the non-transitory computer readable storage medium may also include instructions stored thereon, which when read and executed by one or more computer processors, cause the one or more computer processors to perform steps comprising training a machine learning engine based on a plurality of test results. The machine learning engine may be trained to identify immediate threats or peaks from the plurality of test results.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
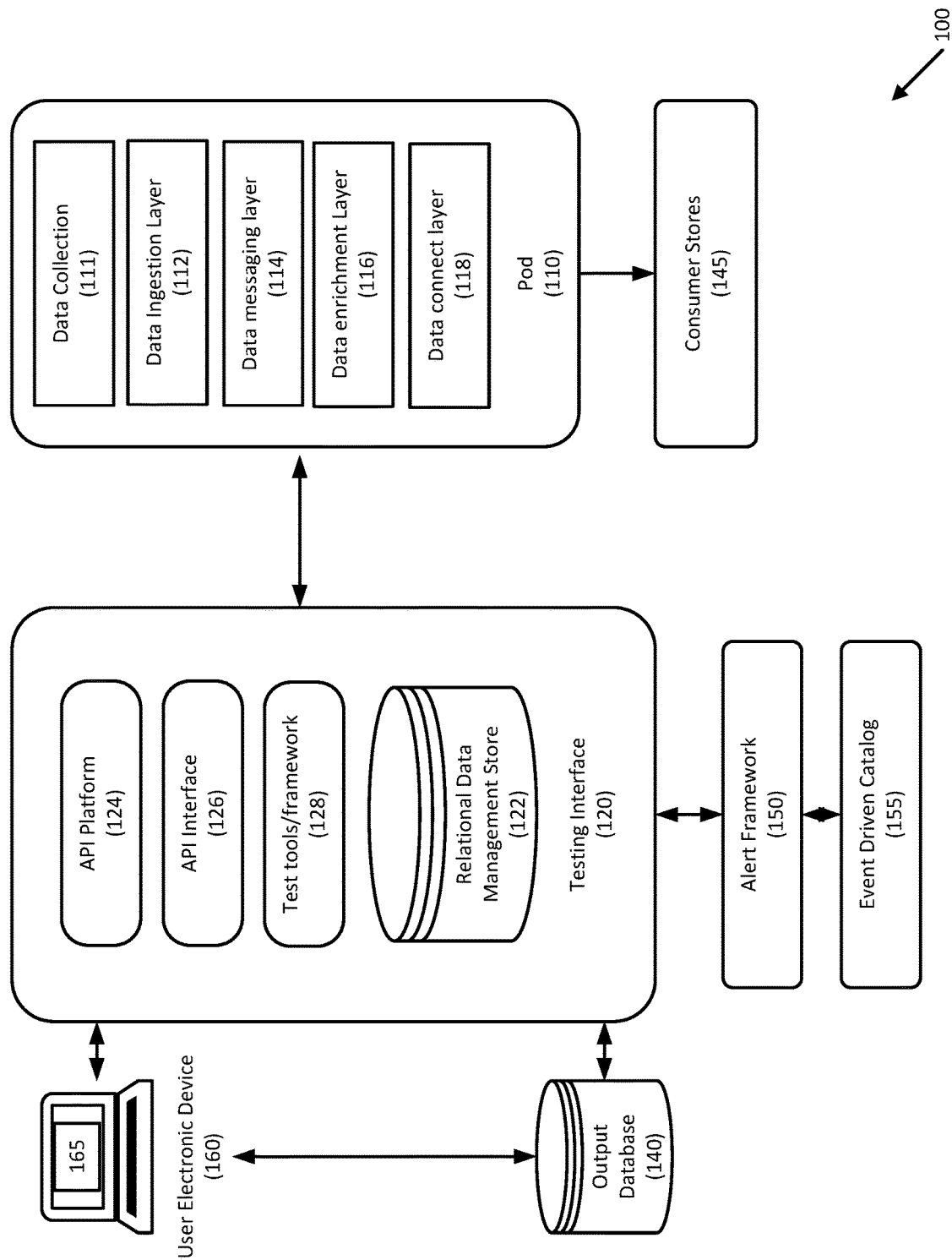
FIG. 1 depicts a self-service testing system according to an embodiment.

Embodiments generally relate to systems and methods for testing components or scenarios with execution history.

Embodiments are directed to a service for managing large volumes of machine data traffic, such as events, logs, metrics, alerts, reference data, etc., reliably and efficiently. Embodiments may provide a unified collection strategy, streamlined data enrichment, and a data pipeline approach that supports any data format and any ingestion protocol. As part of its onboarding process, the service may offer capabilities through a user interface (e.g., program, application, and/or browser-based) or application programming interface (API).

The service may include multiple data layers, including data ingestion, data messaging, data transformation, and data connect. These data layers may exist in a single unit, such as a "pod," and may provide resiliency. A pod may have a specific function or purpose based on a logical grouping of functions, services, etc. provided by the pod. Each data layer may also have several functions and may work in a highly available and scalable mode. A data center may be provided with one or more pods depending on the nature of the data center.

The service may be distributed across multiple zones and data centers to receive data from any device or system.

Each data layer may be provided with nodes, such as one or more virtual machines or similar, that may execute the functions and services of each data layer.

Embodiments may provide notifications and/or alerts based on the results of the test. Embodiments may further provide a history of the tests with respect to weekly releases/deployments, and may provide instant testing to know the performance or improve the user's experience.

Embodiments may further provide: (1) functionality for a platform (e.g., pod components that can be tested using the self-service user interface) to go-live at any point in time (e.g., the capability of testing a component at any time in any environment helps ensure that platform is tested and can go live at any time. It is scheduled and automated manner and integrated with the self-service interface); (2) functionality to ensure that the platform is always available with no down time due to any internal capabilities/functionality to have better customer experience (another way of health-check); (3) a complete view of the execution status of any functionality test suite run; (4) the use of synthetic data or manual input to execute the test suite; (5) functionality to initiate a test on-demand with targeted functionality (UI/API) on the application, or execute a test of the overall or any functionality to which changes were made to be tested in a targeted environment; (6) a view of the history of execution on the tests initiated from the self-service testing interface with execution details; (7) scheduled regression test suite for application and provide status prior to production environment deployment; (8) insight into the application on performance/readiness from overall functional aspect; (9) a load generator utility that gathers synthetic data and adds a load on the system to understand elasticity limits (i.e., part of capacity planning) and performance results; (10) automated tests configured and executed for application as part of health check ensures that application and/or pods are stable and ready for any hotfix or major changes; (11) configuration and creation of automated alerts that as part of the test executions; (12) the ability to simulate a failure in any environment for functionality and analyze on behavior of the application and identify potential self-healing capabilities; etc.

Embodiments may include a utility with self-service and the ability to test anytime as main drivers to get details or status for any integration point or connectivity point by leveraging functions within the utility. Embodiments may allow a user to schedule end-to-end tests and manage the history to review the details. Test execution and details allows us to refer any time without managing additional tools or repositories.

FIG. 1 depicts a self-service testing system according to an embodiment.

System 100 may include one or more pods 110. Although only one pod 110 is depicted in FIG. 1, it should be noted that additional pods 110 may be included as is necessary and/or desired.

Each pod 110 may include a plurality of data layers, such as data ingestion layer 112 (e.g., $112_1$, $112_2$), data messaging layer 114 (e.g., $114_1$, $114_2$), data enrichment layer 116 (e.g., $116_1$, $116_2$), and data connect layer 118 (e.g., $118_1$, $118_2$). For example, data ingestion layer 112 may include a Producer Proxy Agent (PPA) layer and an ingestion API. Data messaging layer 114 may include a data messaging service layer that may provide data replication across pods 110. Data enrichment layer 116 may include a structural query language feature on streaming data to reduce the programming effort, such as KSQL. And data connect layer 118 may be supported by a declarative data integration framework, such as Kafka Connect.

Other data layers, such as a data transformation layer (not shown), may be provided as is necessary and/or desired.

Each data layer may be provided with one or more nodes (not shown), such as virtual machines or similar, that may execute the functions and services of each data layer. The nodes may be horizontally scalable in a dynamic manner.

Pods 110 may receive data from data producers (not shown), such as a data agent or data source that sends data. The data producers may send raw data or derived products. For example, data may be sent by push or pull approaches.

System 100 may further include testing interface 120, which may include API platform 124, API interface 126, and relational data management store 122.

Testing interface 120 may connect to one or more pods 110, which may interface with one or more consumer stores 145. Consumer store(s) 145 may be any suitable storage mechanism and/or platform and may store data that may be used for analytics tools.

Users may access testing interface 120 using application or computer program 165 executed by user electronic device

160. User electronic device 160 may be any suitable electronic device, including computers (e.g., workstations, desktops, laptops, notebooks, tablets, etc.), smart devices, kiosks, terminals, Internet of Things appliances, etc.

In one embodiment, application or computer program 165 may present a self-service testing user interface that provides the user with testing options, such as testing with synthetic data, using manual input, scheduling tests, executing an on-demand test, executing a load generator test, retrieving information, such as an execution history or execution details, etc. Other testing or information retrieval options may be provided as is necessary and/or desired.

Using application or computer program 165, users may execute testing on one or more data layer of pod 110. Testing may be scheduled, or it may be conducted in an ad-hoc manner. For each test, the user may be presented with test results, reports, and any issues so that the issues may be resolved in a timely manner. For each component tested, test cases and test scenarios may be generated and scheduled. The user may customize the testing as is necessary and/or desired using application or computer program 165.

Application or computer program 165 may also provide the user with user testing interfaces and access to exposed APIs associated with those user testing interfaces via, for example, screens. For example, the user testing interfaces may include an onboarding user interface, a data producer onboarding user interface, a data consumer onboarding user interface, a chaos testing user interface, etc. Data onboarding testing may test the functionality to onboard a data source. Pattern database testing may test patterns, data formats, etc. and may generate tests based on the patterns and/or databases. Schema generator testing may test the generation of a schema for ingested data dynamically and may provide recommendations. Data governance testing may test the application of policies or rules to the ingested data. For example, testing may be performed based on policies, schema contracts, data quality rules, etc. Data contract testing may involve identifying the details present or provided by producer or customer to ensure it falls under a data contract, such as a contract between a producer and platform that may include know your customer and other details. Data lineage/data flow testing may test the functionality of querying the lineage and/or flow for a data element.

Testing interface 120 may further include test tools/framework 128. Test tools/framework 128 may include any suitable tools or frameworks for testing. Application or computer program 165 may interface with test tools/frameworks. Test results may be saved to output database 140, and reports may be generated and provided to user electronic device 160.

Testing interface 120 may include relational data management store 122. Relational data management store 122 may store the test results executed by user and display the results to the user using user electronic device 160.

Application or computer program 165 may interface, via relational data management store 122, API platform 124 and/or API interface 126, with one or more data layer (e.g., data collection layer 111, data ingestion layer 112, data messaging layer 114, data enrichment layer 116, and/or data connect layer 118) of pod 110 and may execute tests using an API from test tools/framework 128.

API interface 126 may expose APIs in the organization by providing a proxy layer to route the functions appropriately.

In embodiments, test results may be published to a data analyzer store or a similar service (not shown), or provided to application or computer program 165 executed by user electronic device 160. For example, test results may be stored for historical and/or trending stories to show preventive perspective.

System 100 may further include alert framework 150 and event-driven catalog 155. In one embodiment, alert framework 150 may receive alerts from testing interface 120 and may provide the alert to the necessary parties. In one embodiment, event-driven catalog 155 may identify the types of alerts, thresholds for alerting, etc. Alert framework 150 may receive the alerts and based on the message/payload, may execute certain actions based on the contents of the message. For example, if alert framework 150 receives an alert that there is no space on a data node, alert framework 150 may trigger a process to clean up the space on that node.

Figure 2:
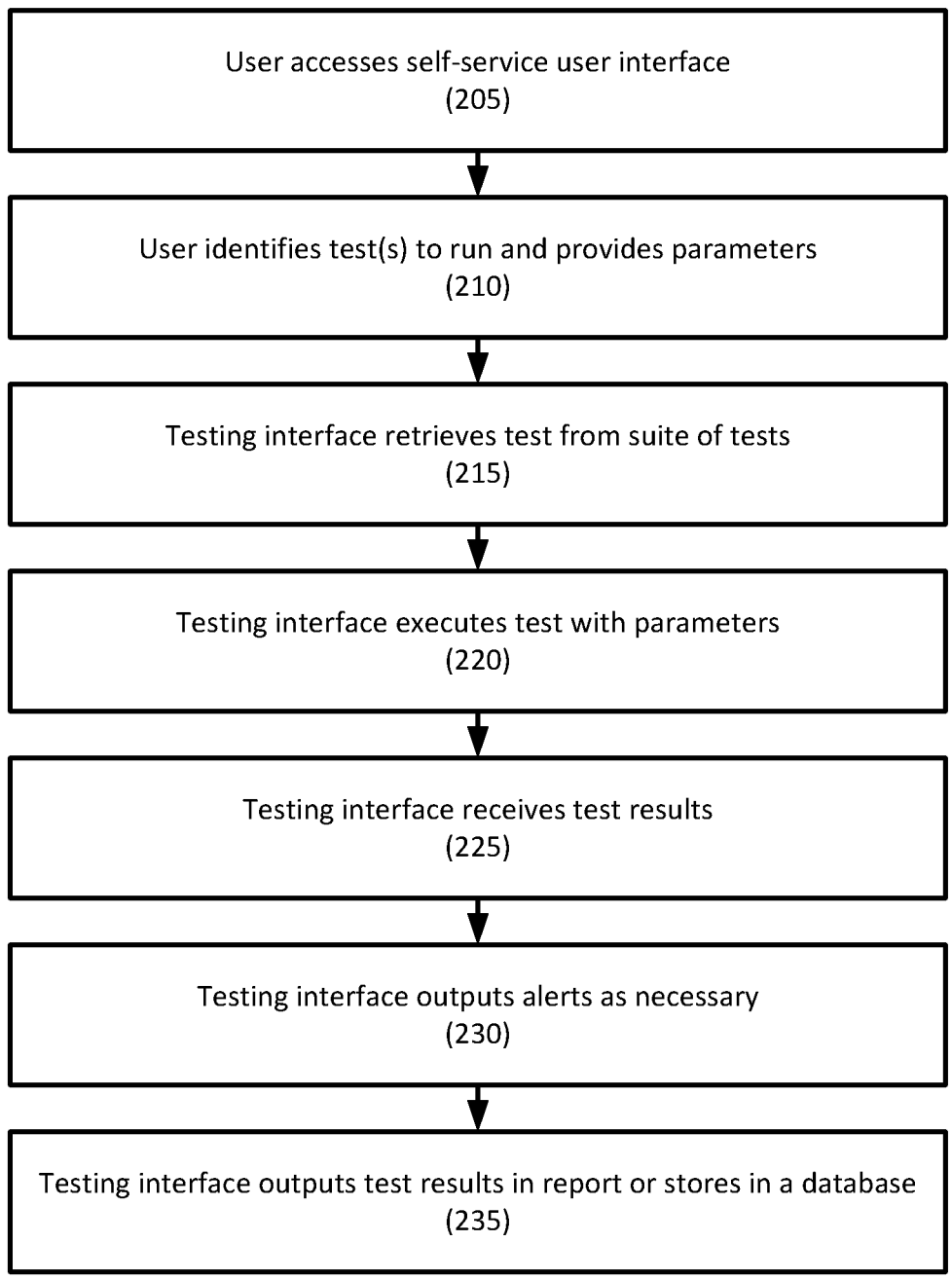
FIG. 2 depicts a method for testing components or scenarios with execution history according to an embodiment.

Referring to FIG. 2, an exemplary method for testing components or scenarios with execution history using a self-service interface is provided according to an embodiment.

In step 205, a user may use an application or computer program executed by a user electronic device to access a self-service testing user interface.

In step 210, the user may identify a test to run on the platform (e.g., a data layer in the pod, such as a data collection layer, a data ingestion layer, a data messaging layer, a data enrichment layer, and a data connect layer). In one embodiment, default parameters/values may be provided to user in the user interface so that the user can change as required. In another embodiment, synthetic data may be created and used for testing. In embodiments, parameters may be based on load and functional criteria of the components being tested.

In step 215, the self-service testing user interface may retrieve the test from a suite of tests. For example, the self-service testing user interface may retrieve the test from a suite of test tools/test framework.

In step 220, the self-service testing user interface may execute the test using the parameters provided by the user.

In one embodiment, the test may be scheduled, may be ad-hoc, etc. In one embodiment, scheduled tests may identify any deviation from successful results so that issues may be resolved proactively.

In step 225, the self-service testing user interface may receive the results of the test, and in step 230, may output any alerts as necessary. For example, if the test fails, an alert may be generated. In another embodiment, alerts may be generated for any results, including successful results. The alerts may be customized.

In step 235, the results may be output in a report and/or stored in a database, displayed in the user interface, etc. In one embodiment, a trained machine learning engine may share immediate threats, peaks, etc. and may predict future peaks, invalid responses, etc. based on pattern(s) in the test results.

Figure 3:
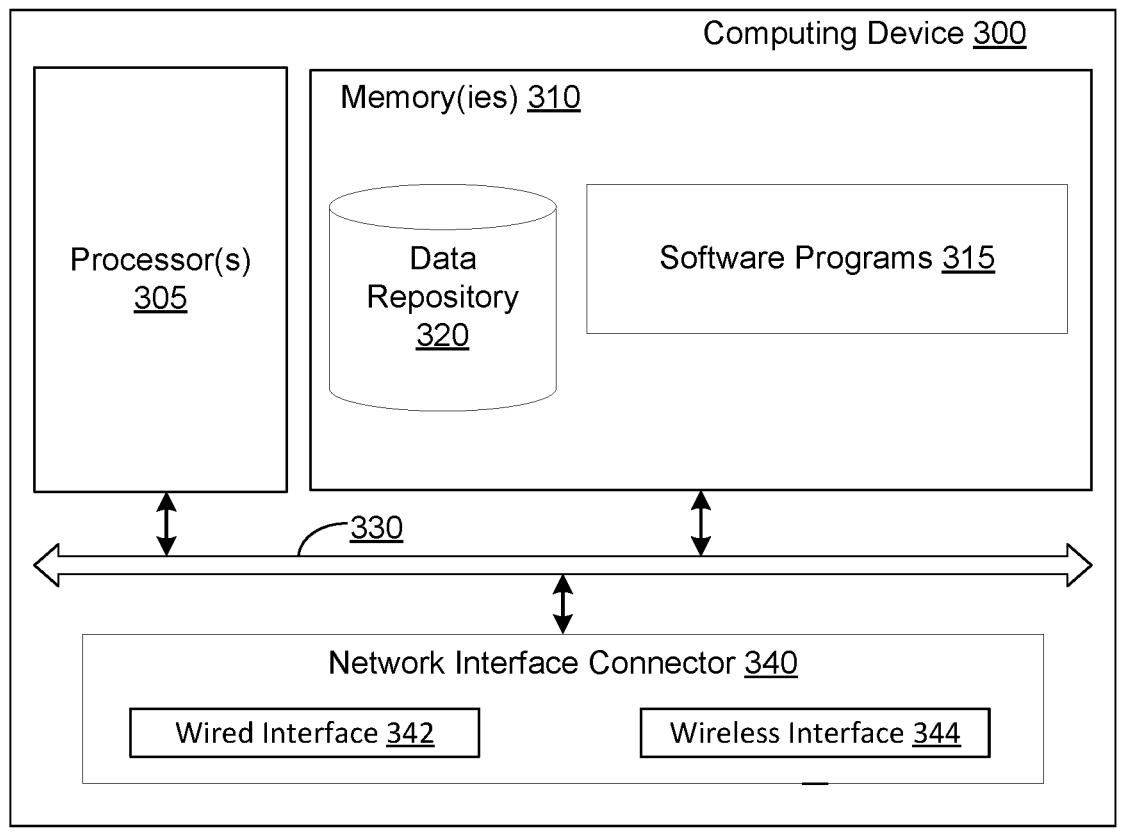
FIG. 3 depicts an exemplary computing system for implementing aspects of the present disclosure.

FIG. 3 depicts an exemplary computing system for implementing aspects of the present disclosure. FIG. 3 depicts exemplary computing device 300 that may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for testing components or scenarios with execution history, comprising:
    receiving, at a testing interface and from an application or program executed by a user electronic device, an identification of an identified test and an identified one or more data layers of a plurality of data layers in a machine traffic management pod to test, the plurality of data layers including a data collection layer, a data ingestion layer, a data messaging layer, a data enrichment layer, and a data connect layer;
    receiving, by the testing interface, a selection of testing parameters or values for the identified test;
    retrieving, by the testing interface, the identified test;
    executing, by the testing interface, the identified test on the identified one or more data layers of the machine traffic management pod using the selected testing parameters or values;
    retrieving, by testing interface, results of the execution of the test; and
    outputting, by the testing interface, the results.

2. The method of claim 1, further comprising:
    retrieving, by the testing interface, default parameters or values for the test; and
    presenting, by the testing interface, the default parameters or values;
    wherein the selected testing parameters or values are a subset of the default parameters or values.

3. The method of claim 1, further comprising:
    outputting, by the testing interface, an alert in response to the execution of the test failing.

4. The method of claim 1, further comprising:
    generating, by the testing interface, synthetic data for the identified test.

5. The method of claim 1, further comprising:
    scheduling, by the testing interface, the identified test.

6. The method of claim 1, further comprising:
    training, by the testing interface, a machine learning engine based on a plurality of test results.

7. The method of claim 6, wherein the machine learning engine is trained to identify immediate threats to one of the plurality of data layers in the machine traffic management pod in the plurality of test results.

8. A system, comprising:
    a user electronic device executing a user testing interface;
    a testing interface executed by a server; and
    a machine traffic management pod comprising a plurality of data layers including a data collection layer, a data ingestion layer, a data messaging layer, a data enrichment layer, and a data connect layer;

wherein:

the testing interface receives an identification of an identified test and an identified one or more data layers of the plurality of data layers in the pod to test from the user testing interface;

the testing interface receives a selection of testing parameters or values for the identified test from the user testing interface;

the testing interface retrieves the identified test from a testing tools/framework comprising a plurality of testing tools and frameworks;

the testing interface executes the test on the identified one or more data layers of the machine traffic management pod using the selected testing parameters or values;

the testing interface retrieves results of the execution of the test; and the testing interface outputs the results.

9. The system of claim 8, wherein:

the testing interface retrieves default parameters or values for the test; and the testing interface presents the default parameters or values;

wherein the selected testing parameters or values are a subset of the default parameters or values.

10. The system of claim 9, wherein the testing interface outputs an alert in response to the execution of the test failing.

11. The system of claim 9, wherein the testing interface generates synthetic data for the identified test.

12. The system of claim 9, wherein the identified test is scheduled.

13. The system of claim 9, wherein the testing interface trains a machine learning engine based on a plurality of test results.

14. The system of claim 13, wherein the machine learning engine is trained to identify immediate threats to one of the plurality of data layers in the pod in the plurality of test results.

15. A non-transitory computer readable storage medium, including instructions stored thereon, which when read and executed by one or more computer processors, cause the one or more computer processors to perform steps comprising:

receiving an identification of an identified test and an identified one or more data layers of a plurality of data layers in a machine traffic management pod to test from a user testing interface;

receiving a selection of testing parameters or values for the identified test from the user testing interface;

retrieving the identified test from a testing tools/framework comprising a plurality of testing tools and frameworks;

executing the test on the identified one or more data layers of the machine traffic management pod using the selected testing parameters or values;

retrieving results of the execution of the test; and outputting the results.

16. The non-transitory computer readable storage medium of claim 15, further including instructions stored thereon, which when read and executed by one or more computer processors, cause the one or more computer processors to perform steps comprising:

retrieving default parameters or values for the test; and presenting the default parameters or values;

wherein the selected testing parameters or values are a subset of the default parameters or values.

17. The non-transitory computer readable storage medium of claim 15, further including instructions stored thereon, which when read and executed by one or more computer processors, cause the one or more computer processors to perform steps comprising outputting an alert in response to the execution of the test failing.

18. The non-transitory computer readable storage medium of claim 15, further including instructions stored thereon, which when read and executed by one or more computer processors, cause the one or more computer processors to perform steps comprising generating synthetic data for the identified test.

19. The non-transitory computer readable storage medium of claim 15, further including instructions stored thereon, which when read and executed by one or more computer processors, cause the one or more computer processors to perform steps comprising training a machine learning engine based on a plurality of test results.

20. The non-transitory computer readable storage medium of claim 19, wherein the machine learning engine is trained to identify immediate threats to one of the plurality of data layers in the machine traffic management pod in the plurality of test results.

* * * * *